Dec. 10, 1963  E. KESZLER  3,113,384
SLIDE CALIPERS
Filed Oct. 17, 1960  2 Sheets-Sheet 1
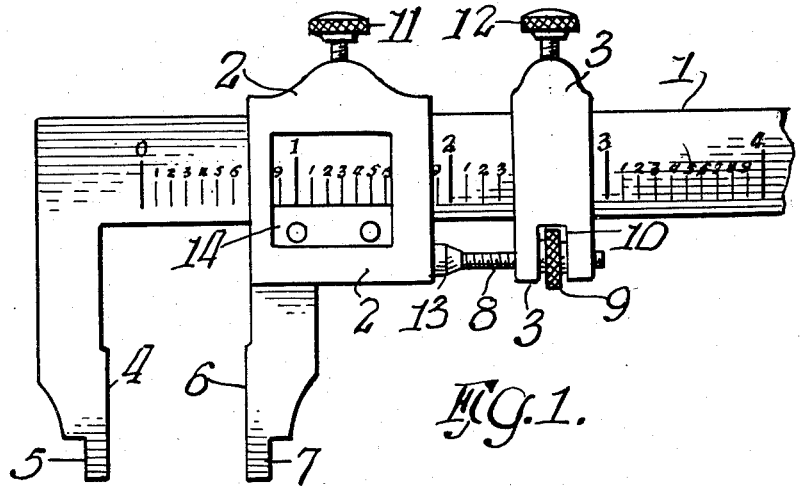
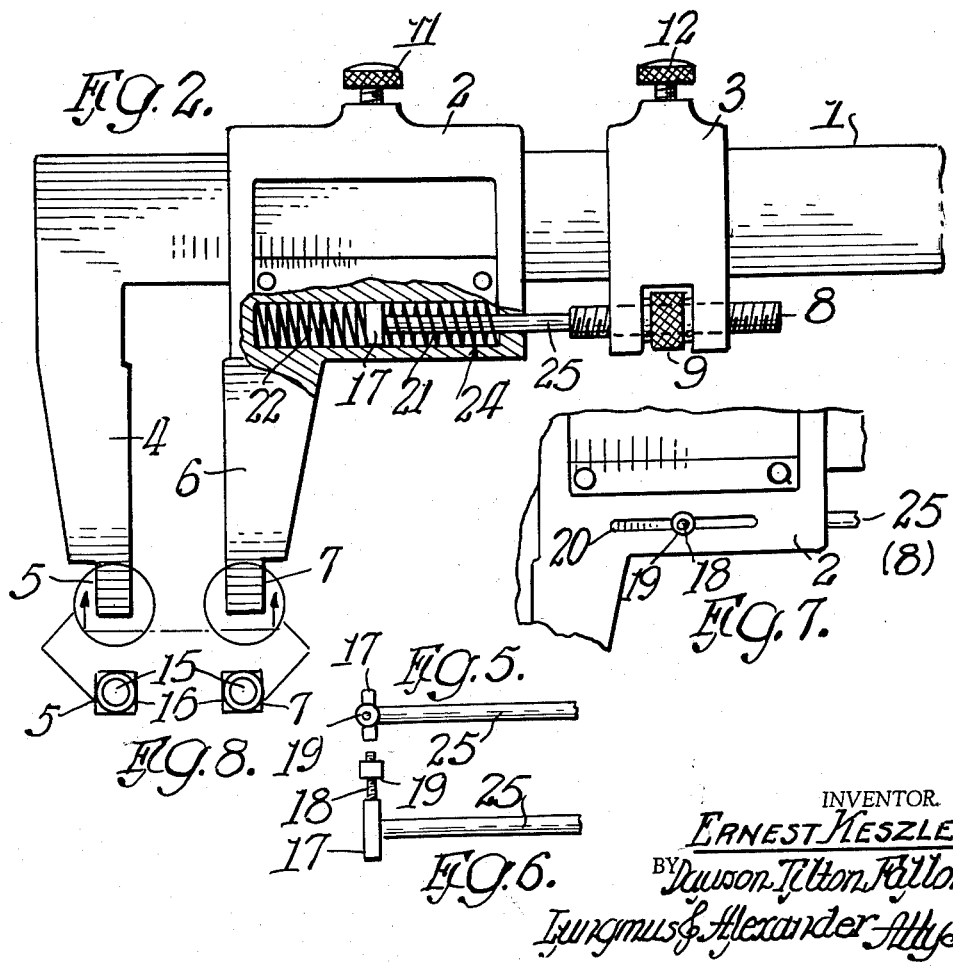
INVENTOR.
ERNEST KESZLER
BY Dawson Tilton Fallon
Jungmus & Alexander Attys

3,113,384
SLIDE CALIPERS
Ernest Keszler, 3525 N. Broadway, Chicago 13, Ill.
Filed Oct. 17, 1960, Ser. No. 62,964
3 Claims. (Cl. 33—143)

The calipers that are now being used for inside and outside measurements consist of the following parts (see FIG. 1): A beam 1 provided with markings of the true scale; a vernier slide 2 provided with markings of the vernier scale 14 and furnished with lock screw 11; an adjusting screw 8, nut 9 and a lock screw 12. To one end of beam 1 a measuring glide 4 is permanently attached and the free end of this latter serves as contact point 5. To slide 2 a measuring glide 6 is permanently attached and the free end of this latter serves as contact point 7. Adjusting screw 8 at one of its ends is fixed to slide 2 by a member 13 and consequently such a relationship is established between slide 2 and slide 3 that both slides can be moved together on beam 1.

The measurement of outside dimensions is being effected through the inside faces of the contact point 5 and contact point 7, the measurement of inside dimensions is being done with the outside faces of these same contact points.

Precision measurements with slide calipers can be taken without errors only if the two contact points of the caliper are placed precisely on the correct points of the part to be measured. The adjustment of the contact points of the presently known calipers to these points is not done automatically but is entirely dependent upon the skill of the operator and is being done with the adjusting screw 8 and the nut 9 in the following manner: slide 3 has to be fastened to beam 1 with the help of lock screw 12 and then by turning nut 9 adjusting screw 8 forces glide 6 of slide 2 and its contact point 7 to move towards or away in relation to the oppositely located contact point 5 of measuring glide 4. Since measuring glide 4 and contact point 5 of beam 1 are in a stiff position in relation to the beam and the measuring glide 6 and contact point 7 of slide 2 are also in a stiff position in relation to the slide 2, these measuring glides and their contact points are not capable neither of self adjustment nor of self alignment on the correct points of the part to be measured. It also greatly influences the precision of the measurement whether the measuring glides, or more precisely their contact points apply a uniform pressure upon these previously mentioned measuring points or whether this pressure varies from time to time. The presently known slide calipers cannot provide control in this respect either. Since these calipers to not have the above mentioned important technical requirements, it is up to the operator to make up for the technical deficiencies of the caliper. Therefore it requires a great amount of skill, practice, know-how and also a certain touch to be able to take accurate measurements with these calipers that are known to date. The technical improvement that is being described and illustrated in the attached drawings eliminates the above mentioned technical deficiencies of the slide calipers.

FIG. 1 illustrates a known slide caliper.

FIG. 2 illustrates the below described improved slide caliper in free state.

Figure 3:
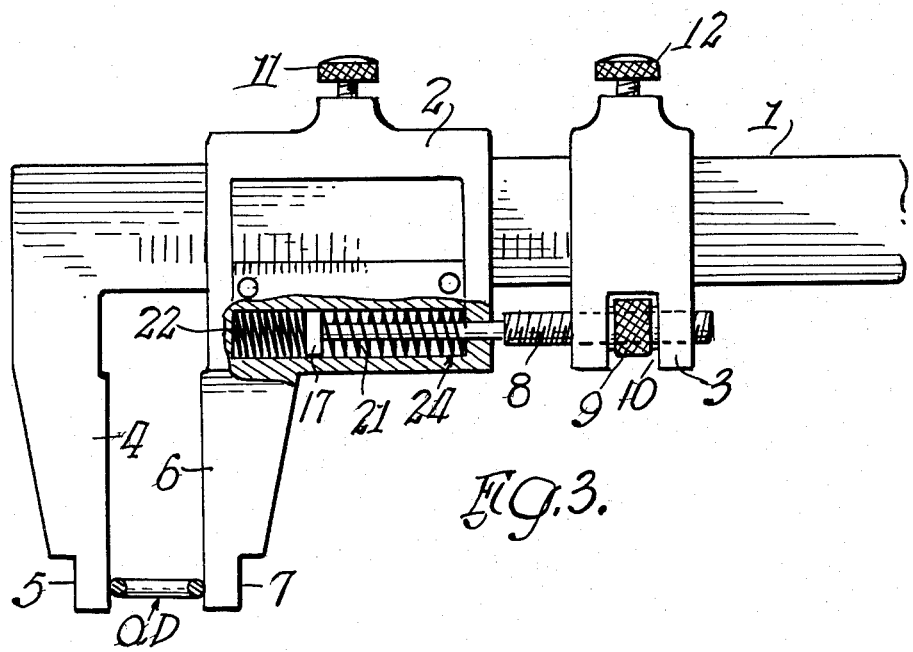

FIG. 3 same as FIG. 2 in working position for measuring outside dimension of part O.D.

Figure 4:
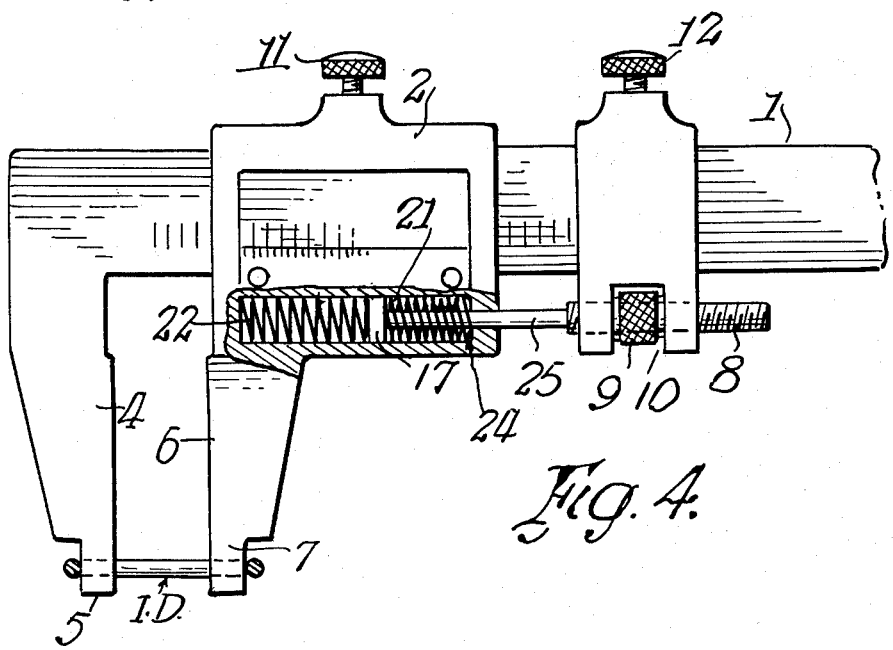

FIG. 4 same as FIG. 2 in working position for measing inside dimension of part I.D.

FIG. 5 and FIG. 6 shows a push-head 17 of member 25 furnished with lock screw 18 and nut 19.

FIG. 7 shows a slot 20 of slide 2 in which lock screw 18 can be moved in horizontal direction.

FIG. 8 shows contact points 5 and 7 furnished with axis 15 and rotating member 16.

When the presently known calipers are being used, the measuring points are found in the following manner: the adjusting slide 3 has to be fastened to beam 1 with help of lock screw 12 but the vernier slide 2 has to remain movable, therefore should not be fastened to beam 1 with the lock screw 11. Then by turning nut 9, slide 2 is being forced by adjusting screw 8 to move horizontally on beam 1. Since adjusting screw 8 is stiffly fixed to slide 2, contact point 7 of measuring glide 6 exerts stiff pressure upon the object to be measured during the course of the measurement. As a result of this stiffness, neither the measuring glides nor the contact points of the slide caliper are capable of either self adjustment or self alignment to the correct points of the part to be measured. The improvement described as follows, completely eliminates this basic technical deficiency.

According to this innovation the adjusting screw 8 is not fixed to slide 2. Adjusting screw 8 contains member 25 and the free end of latter is provided with head 17. Slide 2 contains cavity 24. Member 25 and head 17 are inside cavity 24 in the following manner: head 17 is situated between spring 21 and spring 22 which are placed inside cavity 24. As a result, head 17 is under constant pressure of spring 21 from one direction and of spring 22 from the opposite direction. Consequently, when slide 3 is fastened to beam 1 with the help of lock screw 12, the turning of nut 9 will force screw 8 to move horizontally. If, for example, this movement takes place in the direction of spring 22, it causes head 17 to exert pressure upon spring 22 and therefore spring 22 will exert pressure upon slide 2 thereby forcing slide 2 to move toward measuring glide 4 (see FIG. 3). Since the tension that has been created by screw 8 does not act directly upon slide 2 but is being transmitted by the action of spring 22, therefore the measuring glides and their contact points touch the object to be measured not stiffly but elastically. Because this elastic contact creates the technically necessary conditions for self alignment and self adjustment, the contact points are automatically forced to place themselves on the correct measuring points. In case the measuring points of the object to be measured are located on a rough surface and especially when holes are to be measured, it is advisable to reduce to a minimum the friction that develops between the contact points and the object to be measured. This is achieved by providing the contact points with a rotating member that revolves around an axis. FIG. 8 illustrates an example in which contact points 5 and 7 are furnished with axis 15 and with rotating member 16. The elimination of the friction between the contact points and the object to be measured represents a great technical advantage. The measurement of outside dimensions has to be done in the above described manner and it is self evident that for the determination of inside dimensions nut 9 has to be turned in the opposite direction. According to this invention it is also possible to fasten adjusting screw 8 to vernier slide 2. For this purpose slide 2 is provided with slot 20, furthermore head 17 contains screw 18 and latter is provided with lock nut 199 (see FIGS. 5, 6 and 7). Adjusting screw 8 can be locked into position at any point of slot 20 of vernier slide 2 with the help of nut 19.

I claim:
1. Slide calipers, comprising:
    (A) a generally L-shaped beam member having angularly-related arm portions,
        (i) one arm portion defining a measuring jaw element while

(ii) the other arm portion defines a true scale and a slide-carrying portion, (B) a measuring slide movably mounted on said other arm portion and equipped with
  (i) a depending measuring jaw element cooperating with the first-mentioned jaw element in mensuration,
  (ii) a vernier scale cooperatively associated with said true scale to depict the spacing of said jaw elements, (C) an adjusting slide positionably mounted on said other arm portion and equipped with means for locking the same in a selected position and (D) a resilient connection between said measuring and adjusting slides, said connection comprising
  (i) an elongated member threadedly received in said adjusting slide and slidably received within said measuring slide,
  (ii) said measuring slide being equipped with a bore receiving said elongated member,
  (iii) said elongated member having an enlarged end portion received within said bore, and spring means on opposite sides of said end portion.

2. The structure of claim 1 in which said enlarged end portion is equipped with a laterally-extending projection, said measuring slide being equipped with a slot elongated in the direction of said bore and through which said projection projects, and means on said projection for fixing the position of said projection along the length of said slot.

3. The structure of claim 1 in which said measuring slide is equipped with an opening communicating the outside of said measuring slide with said elongated member, and threaded means extending through said opening for fixing the position of said enlarged end portion along the length of said bore.

References Cited in the file of this patent

UNITED STATES PATENTS

| | | |
|---|---|---|
| 278,094 | Church | May 22, 1883 |
| 2,030,354 | Czemba | Feb. 11, 1936 |
| 2,170,582 | Wolter | Aug. 22, 1939 |
| 2,184,035 | Buccicone | Dec. 19, 1939 |
| 2,952,916 | Germann | Sept. 20, 1960 |